Feb. 7, 1950    H. C. JOHNSTON    2,496,627
INSTRUMENT FOR TESTING RUPTURE
STRENGTH OF SHEET MATERIAL
Filed June 5, 1946    2 Sheets-Sheet 1
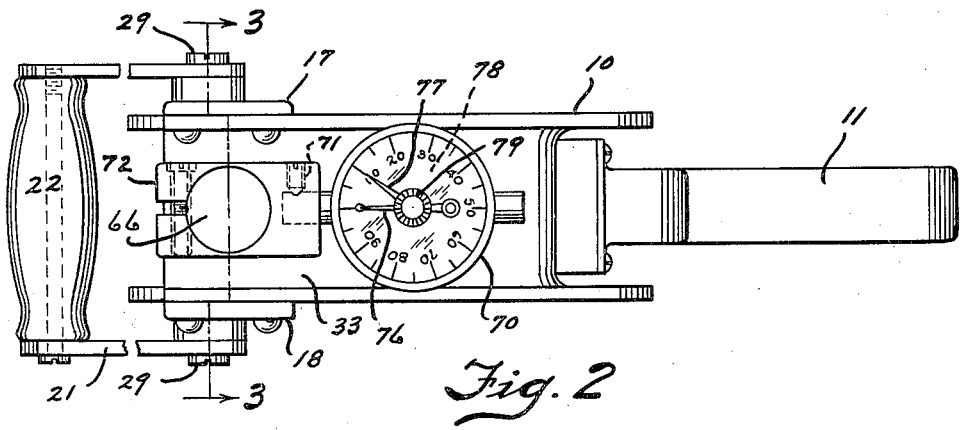
Fig. 2
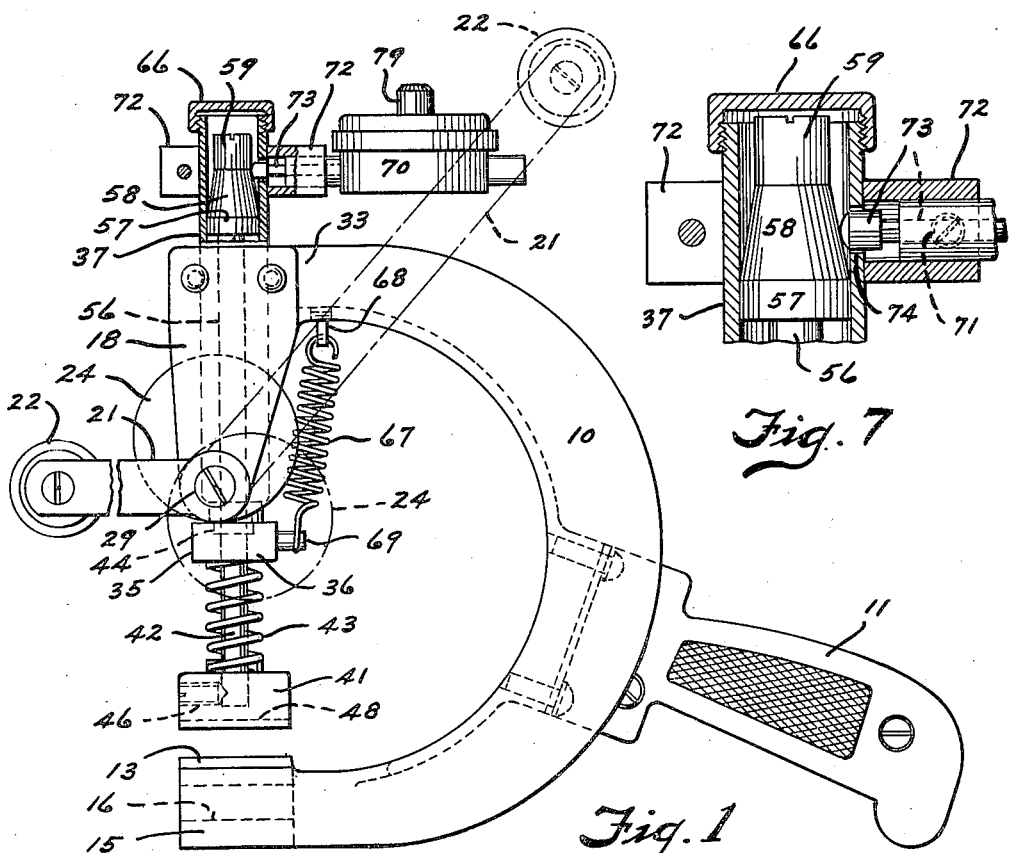
Fig. 7
Fig. 1
INVENTOR.
HAL. C. JOHNSTON.
BY
Spencer, Hardman & Zehe.
HIS ATTORNEYS.

Feb. 7, 1950

H. C. JOHNSTON
INSTRUMENT FOR TESTING RUPTURE
STRENGTH OF SHEET MATERIAL 2,496,627

Filed June 5, 1946

INVENTOR.
HAL. C. JOHNSTON.
BY
Spencer, Hardman & Fehr
HIS ATTORNEYS.

Patented Feb. 7, 1950

2,496,627

UNITED STATES PATENT OFFICE 2,496,627

INSTRUMENT FOR TESTING RUPTURE STRENGTH OF SHEET MATERIAL

Hal C. Johnston, Dayton, Ohio, assignor to General Motors Corporation, Dayton, Ohio, a corporation of Delaware Application June 5, 1946, Serial No. 674,433

5 Claims. (Cl. 73—102)

This invention relates to an instrument or a tool for testing the strength of sheet materials and particularly treated cloth.

Cloth which has been treated to render it waterproof or to toughen it against snagging or tearing and/or which has been stored over a long period of time is ordinarily tested to determine the deteriorating effects, if any, of the cloth prior to fabricating garments therefrom. Instruments or tools heretofore employed for testing such cloth have usually been of the double lever type or of a form resembling a pair of pliers or the like. Such instruments or tools require a great amount of power to operate and after a few hours of operation thereof, in the testing of samples of cloth, the operator's hands become tired and the operator must be relieved of his duty or stop working. I contemplate the provision of a cloth testing tool or instrument the operation of which requires little effort on the part of the operator whereby the operator can manipulate the tool over long periods of time without tiring.

An object of my invention is to provide an improved, sturdy and easily operated cloth testing tool or instrument.

Another object of my invention is to provide an instrument for testing the rupture strength of a cloth, which instrument is operated through rotatable cams set in motion by a swinging movement of a lever.

A further object of my invention is to provide a portable cloth testing instrument which can be carried from one locality to another and operated by the hands of an operator and/or supported on a table top and operated by one hand through rotary motion of a lever.

In carrying out the foregoing objects it is a still further and more specific object of my invention to provide a cloth testing instrument with clamping means, at least one of which, is constructed of a non-metallic material of a character that will more readily adhere to the cloth and particularly treated cloth for tightly gripping the same to prevent slippage during the testing thereof.

Further objects and advantages of the present invention will be apparent from the following description, reference being had to the accompanying drawings, wherein a preferred form of the present invention is clearly shown.

In the drawings:

Fig. 1 is a side view of the cloth testing instrument of the present invention having a portion thereof shown in section;

Fig. 2 is a top view of the instrument;

Fig. 7 is an enlarged fragmentary sectional view taken on the line 7—7 of Fig. 4 showing a means for transmitting movement of parts of the instrument to the indicator gauge.

Figure 6:
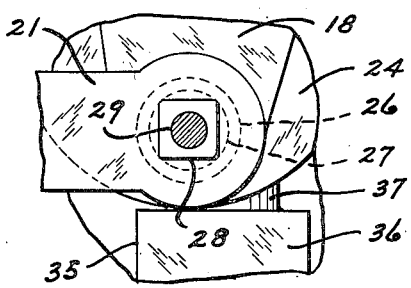
Fig. 6 is an enlarged fragmentary sectional view taken on the line 6—6 of Fig. 3 showing the connection of the lever of the instrument with the cams thereof.

I have shown in the drawings a portable cloth or fabric testing tool or instrument which includes a substantially C-shaped metal frame 10 which is U-shaped in cross-section. A handle 11 is stationarily secured to the frame 10 and cooperates with the lower portion of the frame to form a support for supporting the instrument upon a table top or the like. Clamping means including a first jaw or gripping portion in the form of spaced apart parallel bars 12 and 13 are cemented in slots provided in the lower reinforced end part 15 of frame 10. These bars or inserts 12 and 13 are formed of a suitable non-metallic material such as hard rubber or the like for a purpose to be more fully described hereinafter. A portion of the reinforced end part 15 of frame 10 is cut out as at 16 for a purpose to become apparent hereinafter. A pair of bearing brackets or ears 17 and 18 are secured to the upper end of the frame 10 and depend therefrom to provide a pivot mounting point for a double armed lever 21, having a handle 22, and a pair of matched rotatable cams 23 and 24. Each cam 23 and 24 has a round pivot portion 26 mounted in bearings 27 located in openings provided in the lower part of the ears 17 and 18 (see Fig. 3). That part of cams 23 and 24 which extends beyond the bearings 27 is squared as at 28 (see Fig. 6) to receive a square opening provided in the arms 21 of the lever. Screws 29 threaded into cams 23 and 24 lock the arms of the lever 21 to the cams for rotation with the double armed lever. A metal housing 31 has a flanged mounting portion secured by screws 32 to the upper end part 33 of frame 10. Housing 31 also includes a hollow collar portion 34 (see Fig. 3). This housing serves to support, from the frame 10, a pressure device which is movable toward and away from the stationary clamping means or first gripping portions, formed by bars 12 and 13, by rotation of the cams 23 and 24.

Figure 3:
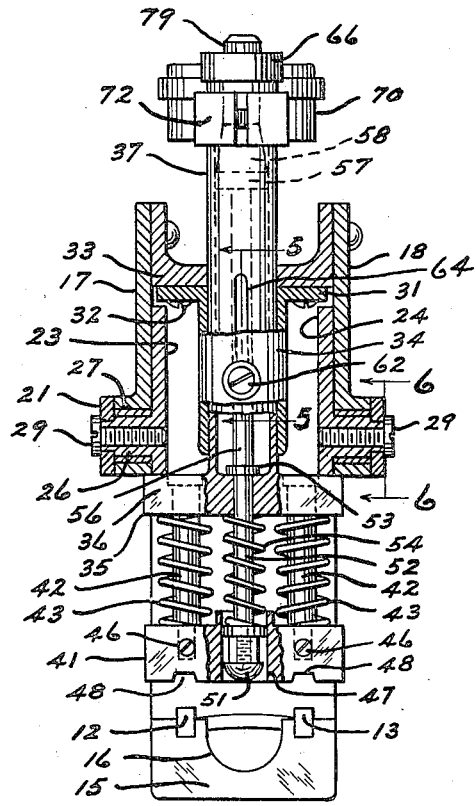
Fig. 3 is a sectional view of the instrument taken on the line 3—3 of Fig. 2 showing certain parts thereof in elevation.
Figure 5:
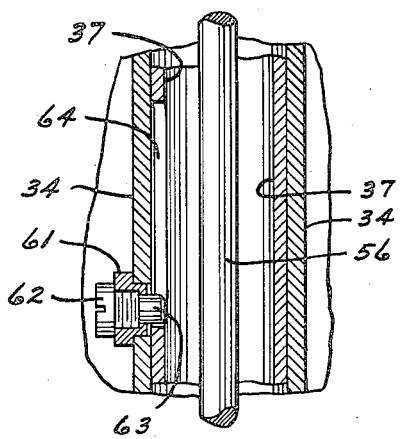
Fig. 5 is an enlarged fragmentary sectional view taken on the line 5—5 of Fig. 3 showing a connection between certain parts of the instrument.

The pressure device in the present structure, employed to clamp a portion of a sheet or cloth or fabric between clamping means for testing its rupture strength, includes a metal member 35 having an enlarged portion 36 and a tubular portion 37 formed integral with one another (see Fig. 3). The tubular portion 37 of member 35 is mounted in the collar portion 34 of housing 31, which is secured to the frame 10, for sliding movement relative thereto. The pressure device also carries a second movable clamping means in the form of an enlarged gripping portion or jaw 41 which is normally held in spaced relation to the enlarged portion 36 on member 35 by yieldable means or springs 43 which surround guide pins 42. Pins 42 have an enlarged head portion 44 located in suitable counterbores provided in the portion 36 of member 35 and have their lower ends inserted in openings provided in jaw or portion 41 and locked therein by set-screws 46. The second clamping means, gripping portion of jaw 41, is provided with a vertical hole 47 centrally thereof and its bottom-side is cut out to provide spaced apart grooves 48 which substantially conform to the shape of the rubber bars mounted on the gripping portion or jaw part 15 of frame 10 for a purpose to be hereafter described. The hole 47 in jaw portion 41 is in alignment with the tubular part 37 of member 35 and receives a plunger head part 51 of a rupturing means. Plunger head 51 is threaded upon a plunger rod 52 which has an enlargement 53 abutted against the top central part of enlarged portion 36 on member 35 by a spring 54 interposed between the plunger head and portion 36. This spring 54, by normally holding the enlargement 53 on rod 52 in abutting engagement with the member 35 positions the apex of the plunger head 51 in horizontal alignment with the bottom wall surface of jaw or gripping portion 41. Rod 52 has a portion 56 extending upwardly, beyond the enlargement 53 thereon, within the tubular portion 37 of member 35. An enlargement 57 on the upper extension 56 of rod 52 engages the inner wall of tube 37 on member 35 and serves as a guide for the rod. A tapered portion 58 and a rounded portion 59 on the top of rod 52 (see Fig. 7) are for a purpose to be presently described. A bushing 61 welded or otherwise suitably secured in an opening provided in the tubular or bearing portion 34 of housing 31 receives a threaded lock screw 62 which has a stud portion or extension 63 fitting in an elongated slot 64 provided in the tubular portion 37 of member 35 (see Fig. 5). The extension 63 fitting in slot 64 permits sliding movement of the tubular portion 37 of member 35 within the tubular portion 34 or housing 31 and prevents rotation of member 35 relative to the housing 31. A cap 66 is threaded upon the upper end of tubular portion 37 to close the open end thereof. In order to insure the return of the pressure device and the movable gripping portion 41 carried thereby to normal position, after having been moved, I mount an extension spring 67 intermediate a stud 68 attached to frame 10 and a stud 69 attached to the enlarged portion 36 of member 35 (see Fig. 1).

A combined gauge and indicator generally represented by the reference character 70, which may be of any conventional or wellknown structure, is mounted upon the upper portion of tubular part 37 of member 35 by being secured, by a set-screw 71, to a clamp 72 (see Figs. 1 and 2). The clamp 72 is rigidly secured to the tubular part 37 of member 35 and is movable therewith. The gauge or indicator 70 may include an operating shaft 73 which extends through an opening 74 provided in the tubular part 37 of member 35 (see Fig. 7). The end of the gauge operating shaft 73 is normally spring-pressed against the rounded top end portion 59 of rod extension 56 and is adapted to be moved toward or into the gauge 70 by upward movement of the rod tapered portion 58. The gauge 70 may also include an indicator hand or pointer 76 and an accumulator hand or pointer 77 (see Fig. 2). The shaft upon which the indicator hand 76 is mounted extends down through a dial 78 and the shaft 79 upon which the accumulator hand or pointer 77 is mounted, extends outwardly of the gauge 70 through the glass crystal over a dial 78. Shaft 79 forms a knob exteriorly of gauge 70 operable for rotating and resetting the accumulator hand or pointer 77. Dial 78 may be graduated with appropriate insignia for a purpose to be described. Shaft 73 of gauge 70 may be connected by gears or other conventional means for transmitting a sliding movement thereof into a rotary movement for rotating the indicator hand or pointer 76 around the dial 78. Pointer 77 may have an extension projecting therefrom into the path of rotation of the indicator hand or pointer 76 for engagement thereby to rotate the same in one direction around the dial along with the hand 76.

Figure 4:
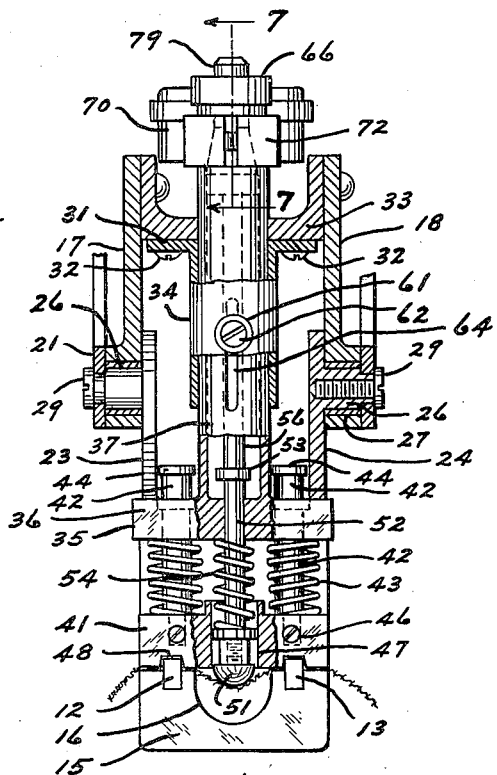
Fig. 4 is a view similar to Fig. 3 showing the relative position of parts of the instrument just prior to rupturing a cloth clamped therein.

Having described the construction of the testing instrument, its operation will now be explained. A sample piece or the edge portion of a sheet of cloth or fabric material to be tested is inserted between the jaw or gripping portion 41 and the bars 12 and 13 forming the other gripping portion or clamping means of the instrument. Double armed lever 21 is swung or rotated, in a clockwise direction as viewed in Fig. 1 of the drawings, about its pivotal mounting, pivot portions 26 of cams 23 and 24, to cause rotation of the cams 23 and 24. The cams 23 and 24 bear upon the part 36 of member 35 and rotation thereof, by the lever 21, moves the pressure device of the instrument. Member 35, pins 42 and jaw or gripping portion 41 move downwardly to clamp the cloth between the gripping grooves 48 in jaw portion 41 and the bars 12 and 13 (See Fig. 4). The bars 12 and 13 being formed of rubber prevents the wax or otherwise treated cloth from slipping during the clamping operation of the instrument. During movement of jaw or gripping portion 41 to bring the grooves 48 into cooperation with bars 12 and 13, plunger rod 52, together with its rupturing head 51 and its extension 56, tubular portion 37 of member 35 and gauge 70, also move downwardly. The slot 64 and tubular portion 37 of member 35 permits reciprocating movement thereof relative to the stationary tubular portion 34 of housing 31, but prevents rotary movement relative thereto for maintaining the grooves 48 of the one portion of the clamping means in alignment with the stationary bars 12 and 13 of the other portion of the clamping means. Further swinging of the lever 21, say for example, into the dot-dash line position thereof, shown in Fig. 1, and consequently additional rotation of cams 23 and 24 causes the springs 43 of the pressure device portion of the instrument to be compressed to tightly clamp the cloth between the first and second portions of the clamping means. At the time springs 43 are compressed plunger spring 54 is also compressed to cause the plunger head 51 to exert more and more pressure on the cloth. The plunger, by engaging the cloth during downward movement of the pressure device portion of the instrument, causes an upward movement of rod 52—56 relative to member 35 just prior to the moment plunger head 51 bursts through or ruptures the cloth, and this movement is transmitted, by tapered portion 58 of the plunger rod, to shaft 73 of the gauge 70. The compression pressure of plunger spring 54, being applied to the cloth through the plunger head 51, is transmitted to and indicated on gauge 70 by this relative movement of parts of the instrument. Upward movement of the tapered part 58 of the plunger rod relative to tubular portion 37 of member 35, causes the indicator gauge shaft 73 to be moved toward the gauge 70. Movement of shaft 73 is transmitted to the shaft upon which indicator hand 76 is mounted and this hand is caused to rotate about the dial 78. Hand or pointer 76 upon being rotated will pick up accumulator hand or pointer 77 and rotate the same therewith. As soon as the plunger 51 breaks through or ruptures the cloth the plunger shaft 52—56 and tapered part 58 thereof will move down, under the force of spring 54, until the enlargement 53 strikes the member 35. This permits the spring-pressed indicator gauge shaft 73 to return to normal position against the rounded part 59 of rod extension 56. The indicator hand or pointer 76 will rotate back to the zero mark on the dial 78 when shaft 73 returns to its normal position, but the accumulator hand or pointer 77 will remain at the highest point on the dial reached by the indicator pointer 76. The accumulator hand or pointer 77 maintains the compression pressure reading of plunger spring 54 on dial 78 until it is manually moved back by rotating the shaft or knob 79. The compression pressure of plunger spring 54 and consequently the rupture strength of the cloth is in this manner indicated on the dial of gauge 70. The pointer 77, being at or between certain pressure points on dial 78, indicates to the operator the condition of the cloth being tested. After rupture of the cloth has occurred the instrument is to be placed in position to test another cloth sample. Lever 21 and cams 23 and 24 are rotated back to their normal position and the extension spring 67 raises the pressure device portion of the instrument so that the two portions 41 and 15 of the cloth clamping means are again opened to receive another cloth sample.

It will be seen that I have provided an improved testing instrument in which very little power or force on the part of the operator is required to operate the same. By employing a rotatable lever, rotatable cams, and by constructing the instrument so that the lever can be manipulated with one hand while the instrument is supported on a table top, permits an operator to work over long periods of time without tiring. The parallel cloth gripping bars on the one portion of the clamping means in my improved instrument stretches the cloth in one direction only and therefore the cloth does not wrinkle at the point of engagement of the testing plunger. By employing certain jaws or clamping means constructed of a non-metallic material they have better adherence to wax or oil treated cloth and no slippage of the cloth occurs in the jaws. The top tapered part of the rupturing plunger rod multiplies movement of the plunger head to the gauge shaft and produces a greater movement of the indicator hand or pointer about the dial to thereby provide a wider and clearer range of readings thereon.

While the form of embodiment of the invention as herein disclosed, constitutes a preferred form, it is to be understood that other forms might be adopted, as may come within the scope of the claims which follow.

What is claimed is as follows:

1. A testing instrument comprising in combination, first clamping means, a movable device, second clamping means on said movable device, a plunger slidably connected with said device and being movable relative thereto, spring means interposed between said plunger and a portion of said device, rotatable cam means for moving said device and said plunger to cause said second clamping means to move into cooperation with said first clamping means for clamping a material to be tested therebetween and to cause said plunger to engage the material and apply pressure thereto through said spring means, a lever connected to and operable for rotating said cam means, and means for registering the compression of said spring means when said plunger ruptures the material.

2. A testing instrument comprising in combination, a frame, first clamping means on said frame, a pressure device carried by said frame and being movable toward and away from said first clamping means, second clamping means on said pressure device, a plunger slidably connected with said pressure device and movable relative thereto, spring means interposed between said plunger and a portion of said device, rotatable cam means for moving said pressure device and said plunger to cause said second clamping means to move into cooperation with said first clamping means for clamping a material to be tested therebetween and to cause said plunger to engage the material and apply pressure thereto through said spring means, a lever pivotally mounted on said frame for rotating said cam means, and means for registering the compression of said spring means when said plunger ruptures the material.

3. A testing instrument comprising in combination, a frame, spaced apart non-metallic gripping bars mounted on a lower part of said frame, a pressure device carried by said frame and being movable toward and away from said gripping bars, the bottom of said pressure device having spaced apart grooves therein substantially conforming to and adapted to receive a portion of said bars, a plunger slidably connected with said pressure device and being movable relative thereto, spring means interposed between said plunger and a portion of said device, rotatable cam means for moving said pressure device and said plunger to cause said grooves in the device to move into cooperation with said non-metallic gripping bars for clamping a material to be tested therebetween and to cause said plunger to engage the material and apply pressure thereto through said spring means, a lever pivotally mounted on said frame for rotating said cam means, and means for registering the compression of said spring means when said plunger ruptures the material.

4. A testing instrument comprising in combination, a substantially C-shaped frame, spaced apart substantially parallel gripping bars mounted on a lower part of said frame, a pressure device carried by said frame and being movable toward and away from said gripping bars, said device including an upper enlarged portion, a lower gripping portion and resilient means between said portions for permitting movement of the portions relative to one another, said lower gripping portion of said pressure device having spaced apart substantially parallel grooves therein substantially conforming to and adapted to receive a portion of said gripping bars, a plunger slidably connected with said pressure device and being movable relative thereto, spring means interposed between said plunger and said upper enlarged portion of said device, rotatable cam means for moving said pressure device and said plunger to cause the grooves in said gripping portion to move into cooperation with said gripping bars for clamping a material to be tested therebetween and to cause said plunger to engage the material and apply pressure thereto through said spring means, a lever pivotally mounted on said C-shaped frame for rotating said cam means, and means for registering the compression of said spring means when said plunger ruptures the material.

5. A testing instrument comprising in combination, a substantially C-shaped frame, first gripping means on said frame, a pressure device carried by said frame and being movable toward and away from said first gripping means, said device including an upper enlarged portion, a lower gripping portion and resilient means between said portions for normally maintaining same in spaced apart relation to one another, a plunger slidably connected with said pressure device and being movable relative thereto and to said portions thereof, a spring interposed between said plunger and said upper enlarged portion of said device, rotatable cams for moving said pressure device and said plunger to cause said gripping portion thereof to move into cooperation with said first gripping means for clamping a material to be tested therebetween and to cause said plunger to engage the material and apply pressure thereto through said spring, a lever mounted on said frame for rotating said cams upon the upper enlarged portion of said device to cause said movement thereof, and means for registering and indicating the compression of said spring when said plunger ruptures the material.

HAL C. JOHNSTON.

REFERENCES CITED

The following references are of record in the file of this patent:

UNITED STATES PATENTS

| Number | Name | Date |
|---|---|---|
| 360,103 | Locke | Mar. 29, 1887 |
| 422,145 | Morrison | Feb. 25, 1890 |
| 827,397 | Schauffler | July 31, 1906 |
| 1,842,323 | Gluzek | Jan. 19, 1932 |
| 1,963,902 | Hires | June 19, 1934 |